March 3, 1959  D. E. NICHOLS  2,875,622
MECHANICAL INTERPOLATOR
Filed Nov. 12, 1954
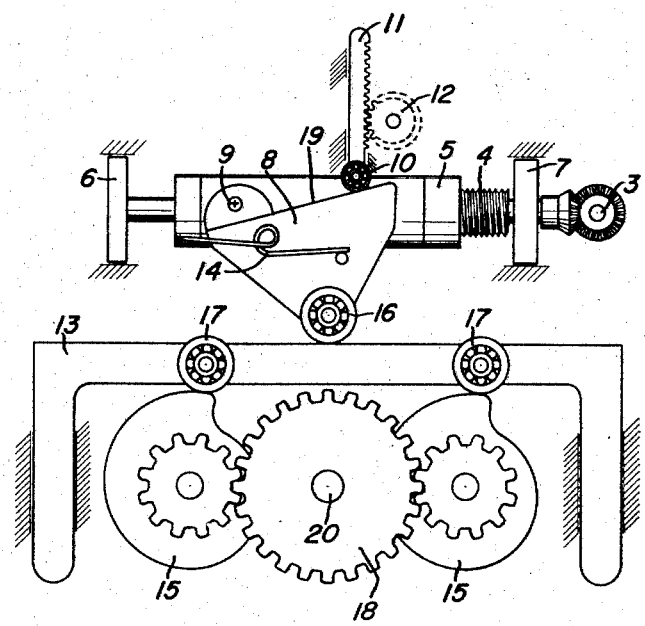
INVENTOR
DONALD E. NICHOLS
BY
ATTORNEY

United States Patent Office 2,875,622
Patented Mar. 3, 1959

2,875,622

MECHANICAL INTERPOLATOR

Donald E. Nichols, Cedar Rapids, Iowa, assignor to Collins Radio Company, Cedar Rapids, Iowa, a corporation of Iowa Application November 12, 1954, Serial No. 468,403

7 Claims. (Cl. 74—99)

This invention relates to cam-actuated control systems and more particularly to such systems for changing a uniform rotary input motion to a variable output motion.

In present-day electronics equipment, tuning indicators are normally provided which indicate a definite frequency change for each revolution of the indicator. This indicator must remain accurate over a wide range of frequencies normally found in present-day equipment. The problem is to make the shaft rotation of the tuning indicator accurate over the frequency range of the equipment when the equipment is tunable by more than one rotary condenser. The use of more than one rotary condenser is normally necessary when operating over a wide frequency range to adequately control the frequency. It is economical to place all of these condensers on one shaft and yet the rotation of the shaft which is necessary to change each condenser a prescribed frequency is different for each condenser. Still a single rotation of the tuning indicator must indicate the same calibrated frequency change. It therefore becomes necessary to change the rotational movement of the indicator shaft to a variable amount of rotation on the shaft which controls the rotation of the condensers if the accuracy of the indicator is to be maintained.

This invention provides a system whereby it is possible to vary the ratio between the angular rotation of the tuning indicator and the angular rotation of the shaft controlling a number of rotary condensers. This invention provides a mechanism whereby the angular rotation of a reference shaft is converted to a variable angular rotation of a second shaft. This mechanism utilizes a lead screw which is operated by the rotation of the reference shaft and which moves a carriage in a linear motion. The carriage has attached thereto a variable slope cam device which drives a cam follower or rack gear connected thereto. This rack gear imparts a rotary motion to a connected shaft. This second shaft may have thereon a plurality of rotary condensers to be tuned by this shaft. This second shaft is rotated a prescribed ratio in relation to the reference rotation. The ratio between the angular rotation of these two shafts is varied by rotating a pair of cams which vary the slope of the surface of the variable slope cam.

It is an object of this invention to provide a mechanism whereby a variable angular output is obtainable from a prescribed angular input. It is another object of this invention to provide an economical method of obtaining variable rotary outputs from a reference rotary input. It is a still further object of this invention to provide a simplified mechanism for changing a known angular movement of a shaft to a variable linear motion. It is still another object of this invention to provide a mechanism whereby a prescribed angular movement becomes a controlled variable angular movement. This and other objects of this invention will become more apparent when the following description is read in conjunction with the accompanying drawing in which:

The figure is a schematic representation of a cam-actuated control system.

The shaft 3 is connected to a reference input and furnishes the reference angular movement to the lead screw 4 by means of a spur and bevel gear arrangement. A possible input to shaft 3 in the mechanism discussed herein as exemplary of the uses of this invention is the rotary motion of the tuning indicator. The rotation of the lead screw 4 is transmitted to the carriage 5 as lateral motion of the carriage. This motion of the carriage occurs because the lead screw is restrained from any movement except rotary movement by fixed members 6 and 7. Now as the carriage 5 proceeds along its path on the lead screw, the cam 8 which is pivotally mounted at point 9 to the carriage presents a surface 19 to the roller 10 of the rack gear 11. Cam 8 is spring loaded by spring 14 and is forced by spring 14 against the frame member 13. The roller 16 of cam 8 is thus forced against the member 13 and rolls thereon as the carriage proceeds in its linear movement. This linear movement causes the entire surface 19 of cam 8 to be presented to roller 10 as the carriage makes one complete movement. The pitch or slope of this surface of cam 8 is dependent upon the positioning of frame member 13 inasmuch as the cam is rotated by the movement of the frame. The closer the frame member is to the carriage, the greater is the rotation of cam 8 about its pivot point 9 and the steeper is the slope of cam 8.

The roller 10 as it travels over the surface of cam 8 will vary in the amount of linear motion it imparts to rack 11 as the slope of cam 8 varies. The gear 12 is thus rotated by rack 11 an amount which is dependent upon the amount of linear motion of rack 11. The linear motion of rack 11 is dependent upon the steepness of the slope of cam 8.

The steepness of the slope of cam 8 is controlled by the position of member 13 relative to roller 16. The variable positioning of member 13 is accomplished by the turning of the shaft 20 which rotates gear 18 and thereby synchronously rotates the cams 15. The cams 15 press against the rollers 17 which are embedded in member 13 and, as the cams are rotated, vary the vertical movement of member 13. Thus the vertical movement or the linear movement of rack 11 is responsive to the pitch or the steepness of the slope of cam 8. The steepness of this slope is controlled by the distance between the pivot point 9 and the member 13. This distance in turn is controlled by the configuration of cams 15 and the particular portion of the surface of these cams which support member 13. The cams are rotatably controlled by the rotation of shaft 20 and so by rotating shaft 20 the reference angular input which comes from shaft 3 is controlled and changed to a variable angular rotation of shaft 12.

Although this invention has been described with respect to a particular embodiment thereof, it is not to be so limited as changes and modifications may be made therein which are within the full intended scope of the invention as defined by the appended claims.

What is claimed is:

1. A cam-actuated interpolating device for establishing variable ratios of angular rotation comprising a rotatable shaft rotated a prescribed amount, a means including a lead screw and a carriage for converting the rotation of said shaft into linear motion of said carriage, a cam pivoted on said carriage, said cam having a roller attached thereto to facilitate movement of said cam axially along said shaft, a rack having a roller attached thereto, said last-mentioned roller in engagement with said cam, a means of varying the slope of said cam by positioning said roller on said cam relative to said shaft whereby the amount of linear motion of said rack is varied.

2. An apparatus for establishing a variable ratio of angular rotation comprising a rotatable shaft, said shaft being rotated a prescribed angle, a means including a lead screw and a carriage connected to said shaft for converting the rotation of said shaft into linear motion of said carriage, a cam pivoted on said carriage, a rack having a roller attached thereto, said last-mentioned roller in engagement with said cam, a means including a pair of synchronously operated cams for varying the slope of said cam whereby the amount of linear motion of said rack is varied.

3. An apparatus for establishing a variable ratio of angular rotation comprising a first control means, a rotatable shaft, said shaft being rotated a prescribed angle by said control means, a means including a lead screw and a carriage connected to said shaft for converting the rotation of said shaft into linear motion of said carriage, a cam pivoted on said carriage, said cam having a roller attached thereto, a movable frame member juxtaposed with said carriage on which said roller of said cam rolls, a rack having a roller attached thereto and in engagement with said cam, a second control means comprising a pair of synchronously rotated cams for varying the position of said movable frame member relative to said carriage whereby the angle of said cam relative to the carriage is varied.

4. An apparatus for establishing a variable ratio of angular rotation comprising a control means, a shaft rotated a reference angular rotation by said control means, means for changing said reference angular rotation into a reference linear motion having predetermined proportional magnitude, a means comprising a cam having a variable slope and a rack gear for changing this reference linear motion into a linear motion of variable magnitude, a means including a second cam having a movable frame supported thereon for controlling the variation in magnitude between the two linear motions, said movable frame positioned by said second cam perpendicular to said reference linear motion, and means for changing the variable linear motion into a variable rotary motion of proportional magnitude.

5. An apparatus for establishing a variable ratio of angular rotation comprising a shaft having a reference angular rotation, means for changing said reference angular rotation into a reference linear motion, a means comprising a cam having a variable slope and a rack gear for changing this reference linear motion into a linear motion, a movable frame member connected to said last-mentioned means, a control means including a pair of synchronously operated cams which alter the position of said movable frame member for controlling the ratio between the two linear motions and means for changing the varied linear motion into a rotary motion.

6. An apparatus for establishing a variable ratio of angular rotation between two shafts comprising a shaft rotated a prescribed angular rotation, means comprising a lead screw and a carriage for changing said angular rotation into a linear motion, a means for changing this linear motion into a linear motion of different magnitude including a movable frame member connected to said last-mentioned means, and means including a pair of synchronously rotated cams which changes the position of said movable frame member, thereby controlling the ratio between the two linear motions and means for changing the variable linear motion into a rotary motion.

7. An apparatus for establishing a variable ratio of angular rotation between two rotatable shafts comprising a first shaft rotated a prescribed angular motion, means connected to said first shaft for changing said angular motion into a first linear motion having predetermined proportional magnitude, a means attached to said last-mentioned means comprising a first cam having a surface with a variable slope thereto for changing said linear motion into a second linear motion of varied magnitude, a control means including a second cam and a movable frame member supported thereon for controlling the slope of said surface of said first cam, said movable frame member positioned by said second cam perpendicular to said first roller motion, a second shaft and means connected to said first cam for changing said second linear motion into a rotary motion of said second shaft of proportional magnitude.

References Cited in the file of this patent

UNITED STATES PATENTS

| | | |
|---|---|---|
| 2,080,665 | Larson | May 18, 1937 |
| 2,325,582 | Anderson | Aug. 3, 1943 |
| 2,669,699 | Shapiro | Feb. 16, 1954 |

FOREIGN PATENTS

| | | |
|---|---|---|
| 694,434 | France | Sept. 16, 1930 |